June 19, 1951 D. O. NELSON 2,557,196

STYLUS STRUCTURE FOR ELECTRICAL RECORDERS

Filed Jan. 25, 1949

INVENTOR
D. O. NELSON
BY E. L. Woodbury
ATTORNEY

Patented June 19, 1951

2,557,196

UNITED STATES PATENT OFFICE 2,557,196

STYLUS STRUCTURE FOR ELECTRICAL RECORDERS

Donald O. Nelson, Los Angeles, Calif., assignor to Bendix Aviation Corporation, South Bend, Ind., a corporation of Delaware Application January 25, 1949, Serial No. 72,581

5 Claims. (Cl. 346—139)

This invention relates to electrical recorders in which a resilient electrically conductive stylus is continuously moved through a closed path in the course of which it periodically traverses a paper tape and produces a mark thereon in response to an electrical discharge, the location of the mark being determined by the position of the stylus at the time of the discharge.

An object of the invention is to provide a simple, light weight yet long lived stylus for an electric recorder of the type described.

Styluses of the type to which the invention relates consist of a short length of spring wire so supported on a moving carriage that the trailing end or tip drags across the recording paper. The stylus must have a spring action for holding the tip against the paper even after a substantial wearing away of the tip has occurred. Unfortunately this spring action causes free vibration of the stylus at the time it snaps off the edge of the paper; the vibration results in fatigue of the metal and eventual breakage near the point of anchorage on the carriage. Furthermore, the length of the stylus that is necessary to provide the desired resilience toward and away from the paper permits undesired yieldability laterally with respect to the direction of movement of the carriage, so that the stylus may not track the same in successive passes across the paper.

In accordance with the present invention, destructive vibration and variable tracking are prevented, while permitting a long stylus, by providing a simple wire guide and stop that substantially prevents lateral motion of the stylus and acts as a stop against which the stylus comes to rest when it leaves the paper.

A full understanding of the invention may be had from the following description which refers to the drawing.

Figures 1, 2:
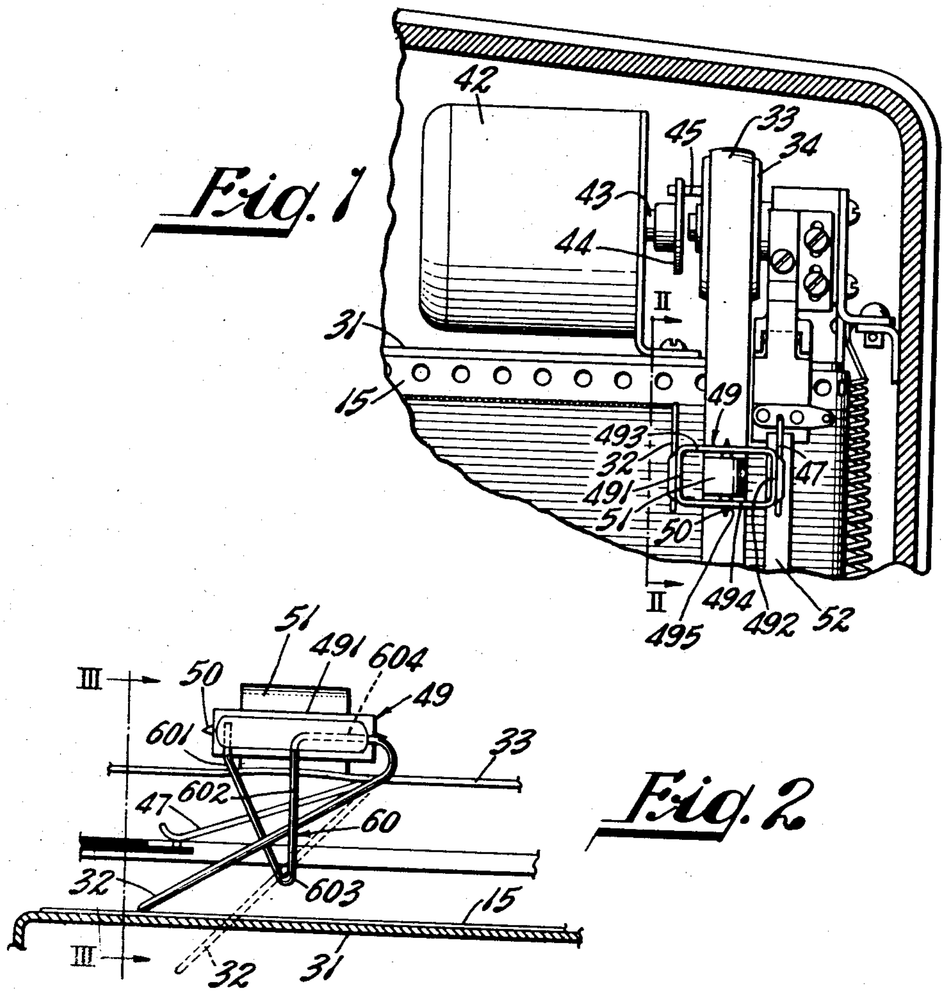
Fig. 1 is a plan view of a portion of a depth recorder equipped with a stylus structure in accordance with the invention.
Fig. 2 is a detail view taken in the plane II—II of Fig. 1 and showing the stylus structure in side elevation.
Figure 3:
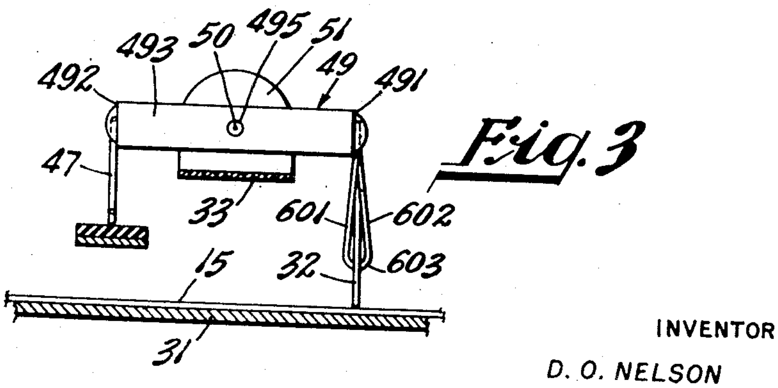
Fig. 3 is a detail view taken in the plane III—III of Fig. 2 and showing the stylus structure in rear elevation.

Fig. 1 shows a portion of a depth recorder which is fully disclosed in application Serial No. 29,146, filed May 25, 1948. Reference is made to that application if further information is desired on the details of operation of such a depth recorder. Since the present invention relates only to the stylus structure fully disclosed in Figs. 1, 2 and 3 it is not believed necessary to fully describe the operation of the recorder.

The portion of the recorder illustrated in Fig. 1 comprises a belt 33 which is stretched between two pulleys, one of which, 34 is illustrated; the other pulley, not shown in the drawing, may be simply an idler pulley. The pulley 34 is coupled by a pin 45 projecting from the pulley 34, and a slotted disc 44 to the shaft 43 of a driving motor 42 for driving the belt 33 at constant speed. There is positioned below the upper stretch of the belt 33 a table 31 which supports a moving record tape 15 which is moved, by means not shown, to the left at a constant speed. A stylus 32 and a brush 47 are carried and moved by the belt 33 to periodically drag the stylus 32 across the record paper 15, the brush 47 being simultaneously carried across suitable cooperating electrical elements for actuating a transmitting circuit associated with the recorder, and for completing electrical connection to the stylus 32. Thus, during traverse of the paper 15 by the stylus 32, the brush 37 rides along a conductive track 52, which is electrically connected to a circuit for supplying a potential to the stylus 32 to produce a mark on the paper 15, the location of the mark being determined by the position of the stylus on the paper at the time the potential is produced.

The stylus 32 and the wire brush 47 are secured, as by soldering, to opposite sides 491 and 492 respectively of a rectangular metal frame 49 constituting a stylus carriage. The other two sides 493 and 494 of this frame 49 have pivot apertures 495 therein which are engaged by conical ends of a pivot bar 50, the mid portion of which is embedded in a block 51 of rubber or the like which is secured, as by vulcanizing, to the belt 33. The block 51 is preferably of relatively soft, flexible material so that it can distort to conform to the curvature of the belt-supporting pulleys as it passes therearound.

The structure including the pivot bar 50 and the frame 49 constitutes a light weight support for the stylus 32 and brush 47 that rocks as necessary to retain the stylus 32 against the paper 15 and retain the brush 47 against its cooperating parts including the track 52. The frame 49 can be easily and quickly removed from the pivot bar 50 by simply squeezing the frame sides 491 and 492 between the fingers, which causes the sides 493, 494 to bow apart out of engagement with the ends of the pivot bar 50.

As best shown in Fig. 2, the stylus 32 extends at an angle of substantially 45° to the paper 15 during its traverse of the paper. As the tip of the stylus wears away, it would soon cease to make contact with the paper 15 if it did not have substantial resilience and were not preloaded with a suitable spring tension. However, because of this preloading, the stylus 32 snaps off the paper 15 as it leaves the trailing edge thereof and, if means were not provided to prevent it, the stylus would vibrate back and forth on each side of its neutral position for a substantial interval of time. Such vibration, repeated during each circuit of the stylus, would cause the stylus to fatigue adjacent its point of anchorage on the carriage 49, with resultant breakage after a relatively short life.

In accordance with the present invention, destructive vibration of the stylus 32 is prevented by providing a wire stop and guide 60 in the general form of the letter V, having two legs 601 and 602 joining each other at the angle 603 of the V, and anchored at their free ends to the side 491 of the carriage 49. It is convenient to form the stylus 32 and the stop 60 from a single piece of wire, as shown in Fig. 2, the upper end of the leg 602 being extended horizontally as a straight section 604 lying against the side 491 of the carriage and merging at its right end into the stylus 32. The section 604 and the upper end of the leg 601 may be attached to the carriage side 491 by soldering or welding.

It is desirable that the legs 601 and 602 act as guides for the stylus 32 to prevent undue side motion of the latter but without restricting free vertical motion thereof, within limits. To this end, these legs 601 and 602 are displaced laterally with respect to each other, as clearly shown in Fig. 3, so that although the V-shaped guide 60 lies approximately in a plane parallel to the direction of movement, it is not exactly so disposed. The result is that while the tip of the stylus 32 is riding over the paper 15 the stylus is unrestrained with respect to vertical movement, and the tip is forced firmly against the paper as a result of the spring tension of the stylus. However, when the stylus leaves the paper, it immediately springs out into contact with the angle 603 of the guide, as shown in dotted lines in Fig. 2. Because of the fact that the stylus snaps into contact with the angle 603 of the guide, free vibration of the stylus is immediately damped, and the life of the stylus is prolonged indefinitely. In fact, its life is determined by the wear of the tip thereof due to friction against the paper 15 and the burning produced by the electrical discharge at the time the marking impulse is applied.

Because of the fact that the stop 60 is of V shape in the plane of movement, it has strength to resist distortion should it catch on anything, such as the leading edge of the paper 15 in case the paper is not flat against the table 31 as it normally would be.

Although for the purpose of explaining the invention, a particular embodiment thereof has been shown and described, obvious modifications will occur to a person skilled in the art, and I do not desire to be limited to the exact details shown and described.

I claim:

1. A stylus structure for an electrical recording device comprising: a stylus carriage adapted to be moved through a closed path, a portion of which path is parallel to a surface to be recorded upon; a spring wire stylus having one end free and having its other end anchored to said carriage, said free end normally trailing from said carriage against said surface, the stylus being of such length that substantial deflection thereof results by contact of its free end with said surface during passage thereover; and a wire loop extending from said carriage and around the stylus and being of such length as to engage the stylus and limit the self-restoring movement thereof when its free end leaves said surface whereby vibration of the stylus is substantially prevented.

2. A stylus structure according to claim 1 in which said loop is substantially V-shaped and so oriented with respect to said carriage that the plane of the V is approximately parallel to the direction of movement.

3. A stylus structure according to claim 2 in which the sides of said V loop are displaced laterally with respect to the direction of movement of said carriage for limited free movement of the stylus therebetween.

4. A stylus structure for an electrical recording device comprising a stylus carriage adapted to be moved through a path, a portion of which is parallel to a surface to be recorded upon, said carriage having a face parallel to the direction of movement, and perpendicular to said surface; a single unitary wire member constituting a spring stylus and a guide therefor, said member comprising a first stylus section having a free end extending from said carriage face in trailing direction toward said surface and merging at its other end in a second section extending alongside and secured to said carriage face, said second section merging at its other end into a third section extending from said carriage face toward said surface on one side of said stylus section, and merging at its outer end into the outer end of a fourth section extending at a sharp angle from said third section back to said carriage face and being secured thereto.

5. A stylus structure according to claim 4 in which said third and fourth sections of said wire member are slightly displaced laterally on opposite sides of the plane of motion of said stylus section whereby motion of said stylus section in its plane of movement is unrestricted.

DONALD O. NELSON.

REFERENCES CITED

The following references are of record in the file of this patent:

UNITED STATES PATENTS

| Number | Name | Date |
|---|---|---|
| 1,858,457 | Mottashed et al. | May 13, 1932 |
| 2,203,057 | Moore | June 4, 1940 |
| 2,391,145 | Finch | Dec. 18, 1945 |